L. M. DOUDNA.
Horse Hay Fork.
No. 64,083.
Patented April 23, 1867.
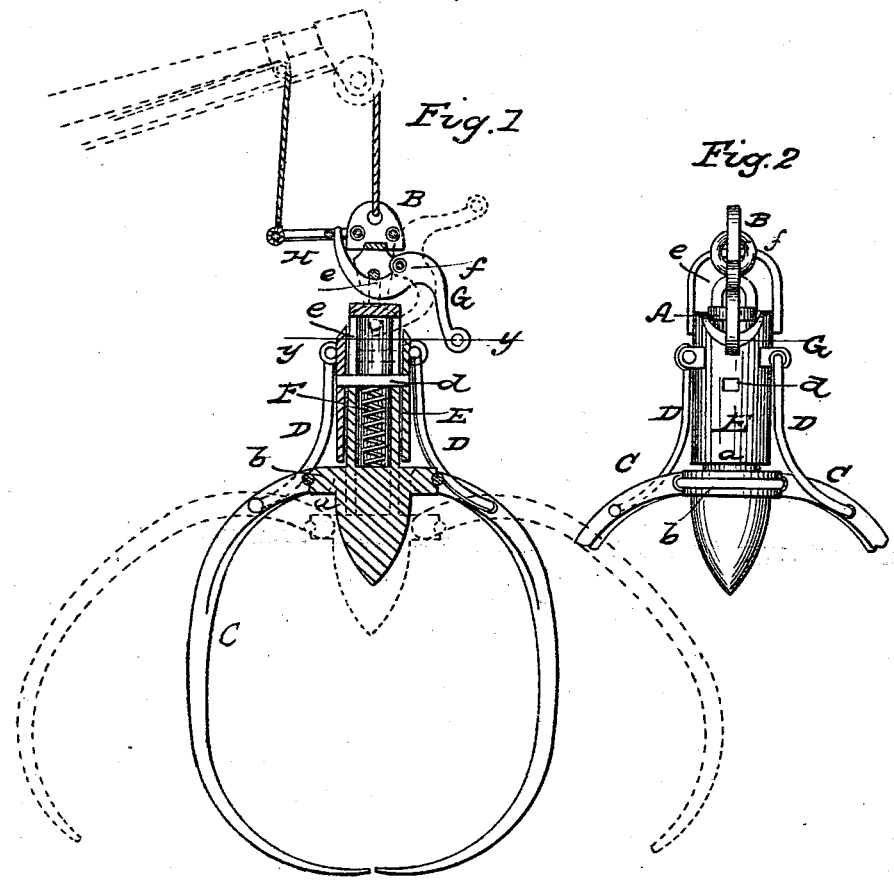
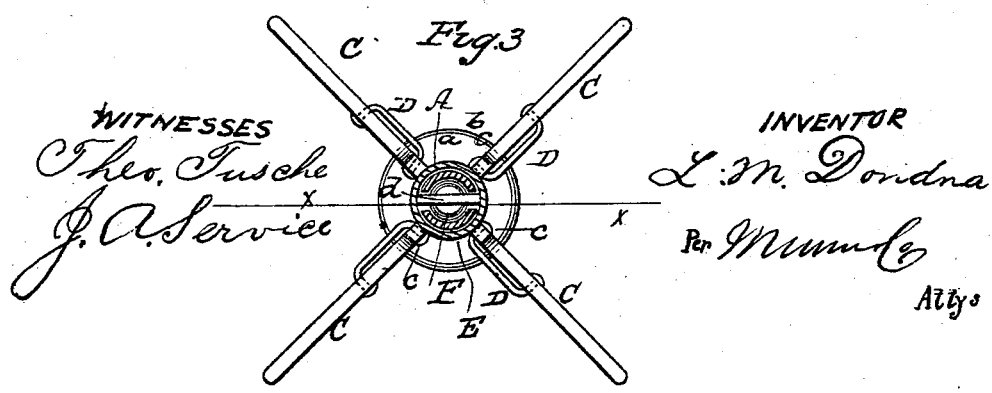

United States Patent Office.

L. M. DOUDNA, OF ELMIRA, NEW YORK.

Letters Patent No. 64,083, dated April 23, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, L. M. DOUDNA, of Elmira, in the county of Chemung, and State of New York, have invented a new and improved Fork for Elevating Hay and Grain; and I do hereby declare that the following is a full, clear, and exact description thereof, which will enable others skilled in the art to make and use the same, reference being had to the accompanying drawings, forming part of this specification.

This invention relates to a new and improved hay and grain-elevating fork, designed more especially for loading wagons or carts in the field from cocks or shocks.

The object of the invention is to obtain a fork for the purpose specified, which will be capable of grasping and elevating at once an entire cock or shock of ordinary dimensions, and admit of having the cock or shock, when elevated, readily released from it. In the accompanying drawings—

Figure 1 is a side sectional view of my invention, taken in the line $x$ $x$, fig. 3.

Figure 2, a side view of the upper part of the same.

Figure 3, a horizontal section of the same, taken in the line $y$ $y$, fig. 1.

Similar letters of reference indicate like parts.

A represents a tube, to the upper end of which a bail, B, is secured, which has the hoisting rope attached to it. At the lower part of this tube there is a circular flange, $a$, having a grooved periphery or edge to receive a wire, $b$, on which the upper ends of four or more tines or teeth, C, are fitted loosely, and at equal distances apart, the tines or teeth being kept at equal distances apart by having their upper ends fitted in notches, $c$, in the flange. These tines or teeth are of curved form, as shown clearly in fig. 1, and they are connected by rods, D, with the upper part of a sleeve, E, which is fitted on the tube A, and allowed to slide freely thereon. The sleeve E has a bar, $d$, passing horizontally through it, said bar also passing through oblong slots, $e$, in the tube A; and within the tube A there is placed a spiral spring, F, the lower end of which bears against the bottom of the tube, and the upper end against the bar $d$. This spring F has a tendency to keep the sleeve E elevated and the tines or teeth C distended or spread out, as shown in red in fig. 1. To the upper end of the tube A there is attached an eye, $e$, through which, when the tines or teeth C are closed, a lever, G, passes, said lever having its fulcrum in a link, $f$, connected to the bail B, the lever, when thus passed through the eye $e$, being held in position by a link, H, attached to the bail, as shown clearly in fig. 1. To the outer end of the link H a trip rope is connected.

The fork, when its tines or teeth are spread out or distended, is placed over the cock of hay or shock of grain to be raised, so as to encompass the whole of it, and the tines or teeth are drawn inward towards each other, so as to grasp the cock or shock by inserting the lever G in the eye $e$ at the top of tube A, and pressing down the outer end of said lever, the lever being retained or held by the link H. The fork is then elevated by a suitable hoisting mechanism, and, when raised over the wagon or cart, the lever G is released from the link H by pulling the trip rope attached to the latter, and the tines or teeth are instantly forced outward from each other under the action of the spring F, and the hay or grain discharged therefrom.

Having thus described my invention, I claim as new, and desire to secure by Letters Patent—

The tube A and sleeve E, in combination with the spring F, tines or teeth C, lever G, and link H, all arranged to operate in the manner substantially as and for the purpose specified.

L. M. DOUDNA.

Witnesses:
   WM. F. McNAMARA,
   ALEX. F. ROBERTS.